United States Patent
Toncelli

(10) Patent No.: US 7,241,710 B2
(45) Date of Patent: Jul. 10, 2007

(54) FABRIC REINFORCED RUBBER SHEET FOR THE PRODUCTION OF SLABS OF RESIN HARDENED FINELY DIVIDED STONE MATERIAL

(76) Inventor: Luca Toncelli, Viale Asiago, 34-36061, Bassano del Grappa (Vicenza) (IT)

( * ) Notice: Subject to any disclaimer, the term of this patent is extended or adjusted under 35 U.S.C. 154(b) by 319 days.

(21) Appl. No.: 10/960,766

(22) Filed: Oct. 7, 2004

(65) Prior Publication Data
US 2005/0112974 A1    May 26, 2005

Related U.S. Application Data

(63) Continuation-in-part of application No. 09/868,160, filed as application No. PCT/EP00/11883 on Nov. 28, 2000.

(30) Foreign Application Priority Data
Dec. 6, 1999   (IT) ............................... TV99U0055

(51) Int. Cl.
 *B32B 5/26* (2006.01)
 *B32B 27/00* (2006.01)
(52) U.S. Cl. .................... 442/250; 442/241; 428/423.9
(58) Field of Classification Search ................ 442/250, 442/239, 241
See application file for complete search history.

(56) References Cited

U.S. PATENT DOCUMENTS

| | | | |
|---|---|---|---|
| 3,904,470 A | 9/1975 | Fukuki et al. | |
| 4,109,784 A | 8/1978 | Hartmann | |
| 4,744,843 A | 5/1988 | Lewis | |
| 4,839,220 A | 6/1989 | Stijntjes et al. | |
| 5,498,470 A | 3/1996 | McLean et al. | |
| 5,928,585 A * | 7/1999 | Toncelli | ....................... 264/71 |
| 6,260,692 B1 | 7/2001 | Sashide et al. | |

FOREIGN PATENT DOCUMENTS

| | | |
|---|---|---|
| JP | 11-130222 | 5/1999 |
| WO | 99 21696 | 5/1999 |

* cited by examiner

*Primary Examiner*—Lynda M. Salvatore
(74) *Attorney, Agent, or Firm*—Katten Muchin Rosenman LLP

(57) ABSTRACT

A shaped sheet usable for the production of slabs made from a material mixture of granulated stone material and/or sand and by a binding resin includes a flat base and a peripheral frame projecting from the base for a predetermined height so as to define a seat of dimensions corresponding in plan to those of the slab to be produced. The structure of the flat base includes a first rubber layer of previously cured rubber forming a first surface which adapted to be in contact with said the material mixture and a second rubber layer of previously cured rubber, a first layer of cloth and a second layer cloth, wherein the said second cloth includes a second outwardly directed surface of the shaped sheet.

12 Claims, 1 Drawing Sheet of slabs composed of a granulate or fine particles of stone material bonded with a hardening resin and, more specifically, to an improvement to the production process therefore.

FABRIC REINFORCED RUBBER SHEET FOR THE PRODUCTION OF SLABS OF RESIN HARDENED FINELY DIVIDED STONE MATERIAL

CROSS-REFERENCE TO RELATED APPLICATION

The present application is a continuation-in-part application claiming priority to U.S. application Ser. No. 09/868, 160 entitled "Rubber Sheet Structure For Use In The Production Of Slabs Of Granulate Or Fine Particles Of Stone Material Bonded With Hardening Resin" filed on Jun. 13, 2001, now abandoned, which is hereby incorporated by reference in its entirety; which is an application filed under 35 U.S.C. §371, which claims priority to PCT application No. PCT/EP00/11883, filed on Nov. 28, 2000, which is hereby incorporated by reference in its entirety; which claims priority to Italian application TV99U000055 filed on Dec. 6, 1999.

BACKGROUND OF THE INVENTION

1. Field of the Invention

The present invention relates to the production of manufactured slabs composed of a granulate or fine particles of stone material bonded with a hardening resin and, more specifically, to an improvement to the production process therefore.

2. Description of the Related Art and Summary of the Invention

These slabs are produced using a method in which a mixture composed of granulate material of selected particle size and synthetic resin is deposited in metered quantities on a conveyor belt which is advanced to a forming station (in which it is subjected to a vacuum compaction operation with simultaneous application of a vibratory movement of predetermined frequency) and subsequently to a station for hardening of the resin (preferably by means of the action of a catalyst and/or heat).

Upstream of the forming station, the upper surface of the mixture deposited on the conveyor belt is covered with a sheet or layer of protective material, which prevents the pressing ram from being soiled by the mixture.

In the past, this sheet of protective material was made of paper, the use of which, however, was accompanied by certain secondary problems subsequent to the actual production process, but nonetheless of considerable importance.

An improvement was subsequently introduced (described and claimed in Italian patent application No. TV96A000007 filed on 29 Jan. 1996—corresponding to U.S. Pat. No. 5,928,585), according to which the paper layer or sheet is replaced by a sheet of resilient material, preferably rubber.

In this way, upon completion of the resinous binder hardening step, the rubber sheet can be removed, by means of tearing, from the surface of the finished slab and subsequently reused.

In the preferred embodiment, the support on which the mixture is deposited before being transferred to the vacuum and vibration compacting station is also protected by a similar sheet of resilient material, in particular rubber.

After the forming step, the mixture deposited on the support and enclosed between the two rubber sheets is in the form of a slab, at the edges of which the two protective rubber sheets are joined together by overlapping their respective edges, substantially completely so as to enclose the raw slab which has been formed but not yet subjected to the resinous binder hardening step.

Since during compaction a portion of the mixture, albeit minimal, inevitably forms a burr interposed between the two edges, after the resinous binder hardening step this burr forms incrustations on the rubber sheets, which are difficult to remove.

Again in the previously know method, a separating liquid is applied to the two edges which are intended to mate, immediately before use on the production line, with the purpose of preventing this problem and also of reducing the chemical ageing of the rubber.

In spite of these measures, however, operations to clean the two rubber sheets, and in particular the two mating edges, are still necessary.

U.S. Pat. No. 6,773,641 in the name of the same Applicant describes further improvements aimed at preventing the formation of incrustations on the rubber sheets, which require laborious cleaning operations, and involving modifications both to the shaping of the protective rubber sheets and to the operating process.

In the first place, the flat configuration of the lower sheet is replaced by a shaped configuration, comprising a flat base and a peripheral border projecting from said flat base over a predetermined height which is smaller by a predetermined amount than the height of the final slab to be produced, so that, after the compaction step, a gap of a predetermined thickness remains between the peripheral edge of the upper sheet and the top of the aforementioned border.

The excess mixture material penetrates into this gap of predetermined thickness during the vacuum vibration compacting step and this material then remains attached to the edge of the slab during the hardening step.

When, after the resinous binder hardening step, the final slab is released by tearing off the two rubber sheets, a hardened raw slab is obtained, said slab having peripherally a border of hardened material which can easily be removed during the normal finishing operations for a slab of stone material.

U.S. Pat. No. 6,773,641 also describes and claims a specific structure of the rubber sheet, in particular the lower sheet, to which the peripheral border is attached, said border defining the cavity for initial deposition of the metered quantity of mixture.

The said structure consists of two or more layers, usually four layers, such as:
 a first layer of rubber (VEF, EPM, PU)
 a first cloth or fabric of non-deformable material (Kevlar, polyester, nylon, aramide)
 a second layer of rubber (EPM, NBR)
 a second cloth or fabric of non-deformable material.

Preferably this cloth or fabric is subjected to preliminary treatments, such as a pretensioning treatment, to avoid subsequent hysteresis phenomena, a thermal stabilization, etc.

However, certain requirements remain in connection with the rubber sheets and must be satisfied in order to obtain optimum results.

In short, these requirements correspond to the following characteristics which the rubber sheet must have:
(a) a resistance to heat and chemical agents so as to withstand operating temperatures which during the resin hardening step are in the region of 1500C;
(b) a good resistance to abrasion and tearing;
(c) retain substantially unaltered properties over time;
(d) possess optimal mechanical properties so as to contain the mixture without undergoing excessive deformations;

(e) undergo minimal shrinkage after forming so as to prevent the formation of surface irregularities in the final product; and (f) a good heat conductivity in order to favour the hardening of the slab.

As regards the nature of the rubber, the most suitable are of a polymeric type resistant to temperature and to chemical agents, usually not for sulphur vulcanization, in particular synthetic rubbers known as EPM (ethylene and propylene copolymers), VKF (fluorocarbon rubbers) and PU (polyurethane rubbers).

Even the use of the previously mentioned composite structure, consisting of a layer of cloth or fabric interposed in the rubber sheet and then embedded or inset therein, does not completely solve the problem.

In fact, even if the rubber sheet is in this way able to contain the mixture during the forming step without undergoing excessive deformation, the final product has surface corrugations, as a result of the shrinkage of the material during the cooling phase and the—albeit minimal—residual elasticity of the rubber.

The present invention discloses further improvements over U.S. Pat. No. 6,773,641. Therein, it has now been discovered that all these problems can be completely and satisfactorily solved with a rubber sheet structure of the type comprising two layers of rubber between which a layer of non-deformable cloth or fabric is interposed, said structure being characterized in that the base of the composite sheet is completed with a second layer of cloth or fabric consisting of non-deformable material, which thereby constitutes the outwardly directed surface. The second layer of cloth or fabric also constitutes an outwardly directed surface which is suitable for being in contact with the oven surface.

Therein, it has also been found that it is advantageous to have the flat base of the shaped sheet and peripheral frame be separately obtained and then bonded together.

Furthermore, the peripheral edge of the shaped sheet is made with a rubber of the same type as the two rubber layers of the flat base, and that the flat base is subject to a final dimensional stabilization treatment comprising heating to a temperature in the region of 160° C. before bonding to the peripheral frame.

BRIEF DESCRIPTION OF THE DRAWINGS

The specific aspects and advantages of the composite structure in accordance with the present invention will appear more clearly from the following description, with reference to the drawings in which.

DETAILED DESCRIPTION

Figure 1:
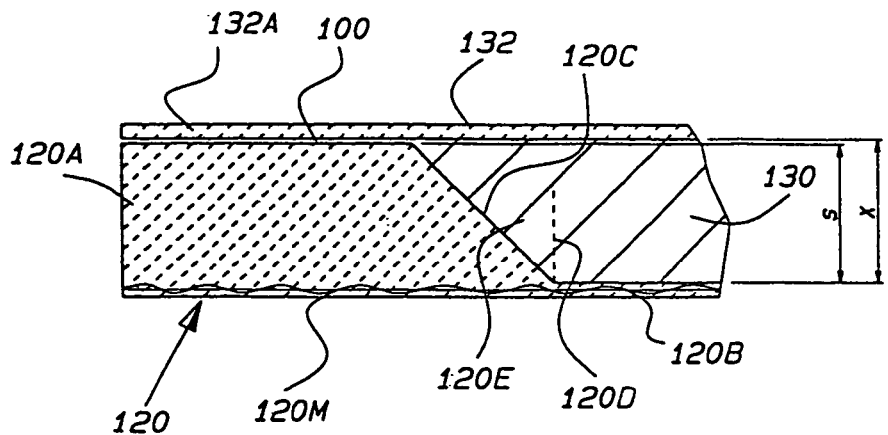
FIG. 1 coincides with FIG. 3 of U.S. Pat. No. 6,773,641, illustrating therefore the structure of the rubber sheets which was used in the previously mentioned method.
Figure 3:
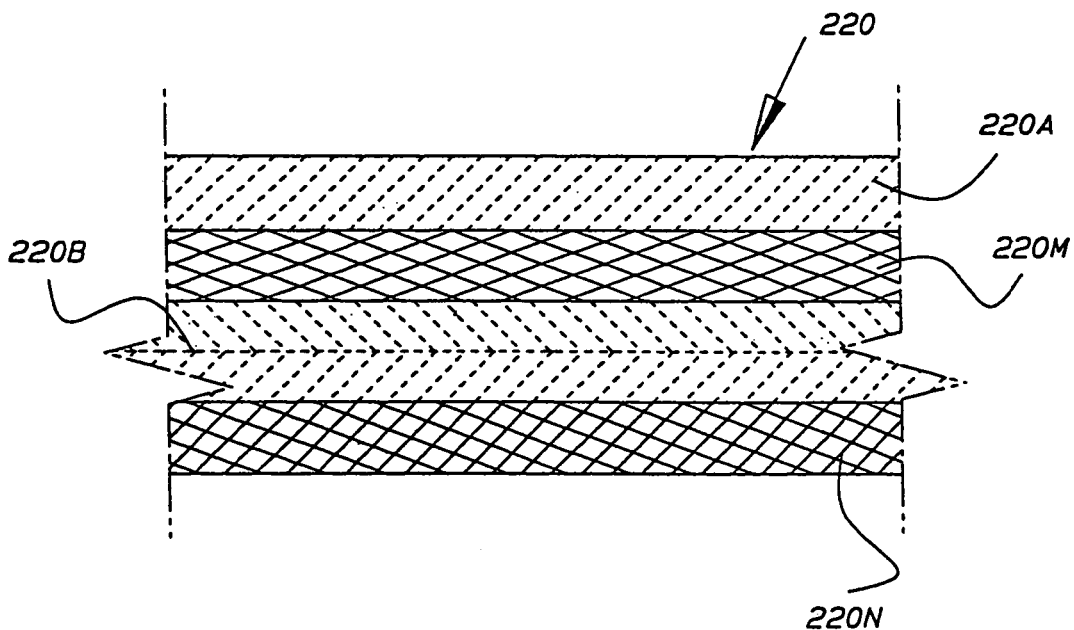
FIG. 3 is an enlarged cross-sectional view of the composite structure of the present invention corresponding to position A in FIG. 2.

It can be seen that FIG. 1 corresponds to FIG. 3 of Italian patent application No. TV97A000148, now U.S. Pat. No. 6,733,641, which is hereby incorporated by reference, which should be referred to for a detailed description.

It can be seen from this figure that the starting mixture 130 is deposited in a cavity defined by a lower sheet 120 and by an upper or covering sheet 132.

A perimetral border 120A, the inner surface of which has a predetermined inclination, is attached to the lower sheet 120.

In FIG. 1, the sheet 120 has a composite structure consisting of a lower sheet of rubber 120 having a flat basis 120B and an inclined peripheral border 120A, a layer 120M of substantially inextensible cloth or fabric (such as Kevlar, polyester or nylon) is embedded and an upper sheet of rubber 132 which is spaced from the said border 120A through a gap 100 of a predetermined thickness along its peripheral edge 132k The end portion 120E of the slab, which is enclosed between the inclined surface 120C and a vertical cross-section defined by the line 120D, is the scrap material to be removed at a subsequent step of the manufacturing process. References X and S designate the thickness of the said peripheral border 120A resp. of the mixture 130.

Figure 2:
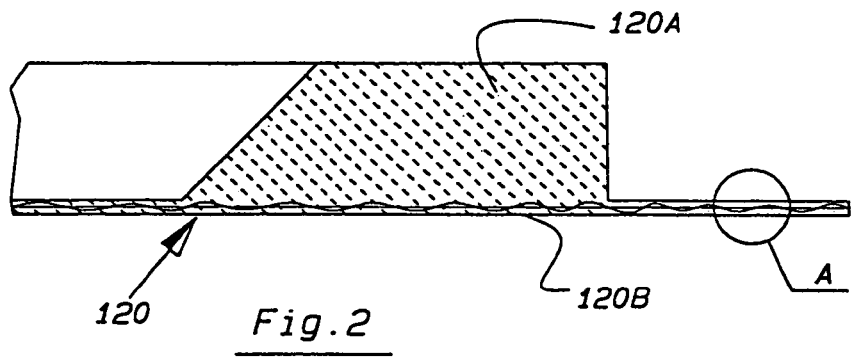
FIG. 2 is a view, similar to that of FIG. 1, of the composite structure in accordance with the present invention

With reference now to the composite structure of the present invention, shown in FIGS. 2 and 3, using where possible the same references as in FIG. 1 and making particular reference to FIG. 3, the sheet 120 comprises two layers of rubber 220A and 220B, between which the layer of inextensible cloth or fabric 220M is interposed.

As previously mentioned, the rubber of the layers 220A and B is an EPM rubber which is vulcanised by means of a peroxide using a known method.

The selected rubber preferably has the following characteristics:

| | |
|---|---|
| Density | 1.05 g/cm$^3$ |
| Hardness | 64 Shore (A) |
| Abrasion resistance | 86 mm$^3$ |
| Heat resistance | 170° C. |

The rubber is worked in such a way to achieve a maximum controlled planarity of 0.5 mm per linear metre, reaching the overall thickness of 4 mm.

In turn, the cloth or fabric of the layer 220M preferably is of the type comprising a welt of polyamide or nylon and a warp of polyester, and is pretensioned in both directions (both well and warp).

As can be seen from FIG. 3, a second layer of cloth or fabric 220N having the same characteristics as the layer 220M is added underneath the rubber layer 220B.

The composite sheet, thus formed, is subjected to a stabilising treatment prior to use, consisting of heating for a few hours (generally from 1 to 3 hours) to a temperature higher than the maximum operating temperature, so that, in the present method (in which resin hardening takes place at a temperature in the region of 150 degrees C.), the stabilising temperature is in the region of 160 degrees C. (for approximately 2 hours).

The desired results can be obtained with the sheet structure in accordance with the present invention.

In particular, it is desirable that both the lower sheet 220 and the upper sheet should have the same structure, so as to guarantee perfect homogeneity of thermal exchange with the mixture contained in the "sheath" defined by the two-upper and lower-rubber sheets.

Therein, it is also desirable to obtain the flat base and the peripheral border separately and then bond them together.

In this case, the peripheral border is made from four profiles, folded in an L-shape, of the same type of rubber as the rubber layers in the flat base. The profiles are cured before application onto the flat base, after the flat base has undergone the above described stabilizing treatment. The mating surfaces of the flat base and of the profiles are preliminarily roughened to improve their bonding which makes use of EPDM liquid rubber as bonding agent. Green sheets also of EPDM rubber are positioned at the free ends of the profiles to ensure their mutual bonding. Finally, all the bonded areas are cured.

Moreover, the lower cloth 220N also favours the handling of said sheath containing the mixture through the various stations of the slab production plant.

In particular, it is worth noting that with the structure according to the present invention the compressive strength or rather the resistance to extreme loads of the moulding sheath is increased, preventing the appearance of wrinkles on the surfaces of the product.

What is claimed is:

1. A shaped sheet for the production of slabs from a material mixture of granulated stone material mid/or sand and by a binding resin, the shaped sheet comprising:
    a flat base and a peripheral frame projecting from the base for a predetermined height so as to define a seat of dimensions corresponding in plan to those of the slab to be produced; wherein the structure of the flat base comprises:
        a first rubber layer of previously cured rubber forming a first surface adapted to be in contact with the material mixture and a second rubber layer of previously cured rubber, the first and second rubber layers having same heat transfer properties,
        a first layer made of a non-deformable cloth or a non-deformable fabric interposed between the first and second rubber layers, and
        a second layer made of a non-deformable cloth or a non-deformable fabric provided on the second rubber layer, wherein the second cloth or fabric layer comprises a second outwardly directed surface of the shaped sheet.

2. A shaped sheet according to claim 1, wherein the rubber is one of ethylene and propylene copolymers or fluorocarbon rubbers or polyurethane rubbers.

3. A shaped sheet according to claim 1, wherein the first and second non-deformable layers are formed by a polyester warp and a nylon welt.

4. A shaped sheet according to claim 1, wherein a stabilization treatment heating is performed for 1-3 hours on the flat base.

5. A shaped sheet according to claim 1, wherein the shaped sheet comprises of a flat base and an inclined peripheral border so as to constitute a cavity into which the material mixture is deposited to undergo the process for the production of a slab.

6. A shaped sheet according to claim 1, wherein the first and second rubber layers are cured by means of a peroxide using a vulcanization method.

7. A shaped sheet for the production of slabs from a material mixture of granulated stone material mid/or sand and by a binding resin, the shaped sheet comprising:
    a flat base and a peripheral frame projecting from the base for a predetermined height so as to define a seat of dimensions corresponding in plan to those of the slab to be produced; wherein the structure of the flat base comprises:
        a first rubber layer of previously cured rubber forming a first surface adapted to be in contact with the material mixture and a second rubber layer of previously cured rubber, the first and second rubber layers having same heat transfer properties,
        a first layer made of non-deformable cloth or a non-deformable fabric interposed between the first and second rubber layers, and
        a second layer made of a non-deformable cloth and a non-deformable fabric provided on the second rubber layer, wherein the second cloth or fabric layer comprises a second outwardly directed surface of the shaped sheet,
    and wherein the flat base is subject to a final dimensional stabilization treatment comprising heating to a temperature in the region of 160° C. before bonding to the peripheral frame, the peripheral frame being made with previously cured rubber of the same grade as the said first and second rubber layers.

8. A shaped sheet according to claim 7, wherein the rubber is one of ethylene and propylene copolymers or fluorocarbon rubbers or polyurethane rubbers.

9. A shaped sheet according to claim 7, wherein the first and second non-deformable layers are formed by a polyester warp and a nylon welt.

10. A shaped sheet according to claim 7, wherein the stabilization treatment is performed for 1-3 hours.

11. A shaped sheet according to claim 7, wherein shaped sheet comprises a flat base and an inclined peripheral border so as to constitute a cavity into which the material mixture is deposited to undergo the process for the production of a slab.

12. A molded rubber sheet structure according to claim 7, wherein the first and second rubber layers are cured by means of a peroxide using a vulcanization method.

* * * * *